(12) United States Patent
Westlund

(10) Patent No.: US 12,154,393 B2
(45) Date of Patent: Nov. 26, 2024

(54) CLOSED LOOP PARALLEL BATCH DATA LOGGING IN A VEHICLE

(71) Applicant: Volvo Car Corporation, Gothenburg (SE)

(72) Inventor: Robin Westlund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 1278 days.

(21) Appl. No.: 16/447,455

(22) Filed: Jun. 20, 2019

(65) Prior Publication Data

US 2020/0402328 A1 Dec. 24, 2020

(51) Int. Cl.
| | |
|---|---|
| G07C 5/08 | (2006.01) |
| G06F 16/90 | (2019.01) |
| G06N 5/02 | (2023.01) |
| G06N 5/022 | (2023.01) |
| G06T 19/00 | (2011.01) |
| G06F 16/906 | (2019.01) |

(52) U.S. Cl.
CPC ........... G07C 5/0816 (2013.01); G06N 5/022 (2013.01); G06T 19/006 (2013.01); G07C 5/085 (2013.01); G06F 16/906 (2019.01)

(58) Field of Classification Search
CPC ...... G07C 5/0816; G07C 5/085; G07C 5/008; G07C 5/0808; G07C 5/0841; G06N 5/022; G06N 5/003; G06N 20/10; G06N 20/20; G06N 7/005; G06N 7/023; G06N 3/0445; G06N 3/0454; G06N 3/0472; G06N 3/08; G06T 19/006; G06F 16/906
See application file for complete search history.

(56) References Cited

U.S. PATENT DOCUMENTS

| | | | |
|---|---|---|---|
| 6,356,823 B1 | 3/2002 | Iannotti et al. | |
| 7,457,693 B2 | 11/2008 | Olsen et al. | |
| 9,311,271 B2 * | 4/2016 | Wright | H04M 1/72454 |
| 9,881,428 B2 | 1/2018 | Barfield, Jr. et al. | |
| 10,339,470 B1 * | 7/2019 | Dutta | G06N 20/20 |
| 2013/0226366 A1 * | 8/2013 | Biondo | G07C 5/085 |
| | | | 701/1 |
| 2016/0321545 A1 * | 11/2016 | Kreis | G05B 13/048 |
| 2020/0256699 A1 * | 8/2020 | Robeson | G08G 1/0141 |
| 2020/0342303 A1 * | 10/2020 | Stent | B60W 30/0956 |

FOREIGN PATENT DOCUMENTS

CN 105034985 A 11/2015

* cited by examiner

*Primary Examiner* — Adam D Tissot
(74) *Attorney, Agent, or Firm* — Amin, Turocy & Watson, LLP

(57) ABSTRACT

Systems, methods and computer program products that facilitate closed loop parallel batch data logging in a vehicle. A system can include a memory and a processor that executes computer executable components. The computer executable components can include: a data collection component that receives data from a plurality of devices related to a vehicle, and the data collection component stores batches of the data as data chunks, an event component that determines an event associated with the vehicle and a transmission component that transmits a chunk of the data chunks temporally associated with the event.

26 Claims, 15 Drawing Sheets

CLOSED LOOP PARALLEL BATCH DATA LOGGING IN A VEHICLE

TECHNICAL FIELD

Embodiments disclosed and claimed herein relate to techniques that facilitate closed loop parallel batch data logging in a vehicle.

BACKGROUND

A vehicle is typically equipped with numerous systems and devices that continuously generate data during operation of a vehicle. Data collection systems used in vehicles collect and store data generated by vehicular systems and devices, resulting in a large corpus of data stored in the vehicle. However, there are disadvantages to collecting and storing large data files in the manner employed by existing data collection and storage solutions. In a vehicle, the efficient use of data storage capacity and speed of data analysis are important considerations. A large corpus of data requires significant storage capacity and slows down analysis of data. Also, a large corpus of data makes it difficult to rapidly transmit data wirelessly for remote analysis.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that facilitate closed loop parallel batch data logging in a vehicle.

A vehicle's data collection system can be improved by collecting batches of data as data chunks and then storing data temporally associated with an event associated with the operation or maintenance of the vehicle that requires analysis. When an event associated with the operation or maintenance of the vehicle occurs, a data chunk temporally associated with the event can be transmitted easily and analyzed quickly due to its small size. Data chunks not associated with such an event can be temporarily stored but then discarded. Instead of storing data in a long, continuous log, data can be stored as data chunks and preserved only when temporally associated with an event associated with the operation or maintenance of a vehicle, thus reducing data storage needs.

In accordance with an embodiment, a system comprises: a memory and a processor that executes computer executable components. The computer executable components can include a data collection component that receives data from a plurality of devices related to a vehicle, and the data collection component stores batches of the data as data chunks, an event component that determines an event associated with the vehicle, and a transmission component that transmits a chunk of the data chunks temporally associated with the event.

In accordance with another embodiment, a system comprises: a memory and a processor that executes computer executable components. The computer executable components can include a data collection component that wirelessly receives a chunk of data from a vehicle, wherein the data chunk is temporally associated with an event associated with the vehicle, an analysis component that analyzes the data chunk, and determines or infers cause of the event, a recommendation component that recommends a course of action in response to the event, and a transmission component that wirelessly transmits the recommendation to the vehicle.

In some embodiments, elements described in connection with the disclosed systems can be embodied in different forms such as a computer-implemented method, a computer program product, or another form.

DETAILED DESCRIPTION

The following detailed description is merely illustrative and is not intended to limit embodiments and/or application or uses of embodiments. Furthermore, there is no intention to be bound by any expressed or implied information presented in the preceding Summary section or in the Detailed Description section.

Embodiments described herein include systems, methods, and computer program products that facilitate closed loop parallel batch data logging in a vehicle. Instead of storing data in a long, continuous log, which creates a large corpus of data, data can be stored as data chunks and preserved only when temporally associated with an event associated with the operation or maintenance of a vehicle, thus reducing data storage needs and enabling faster transmission of data. Also, upon the occurrence of an event in a vehicle that requires analysis, the data analyzed can be limited to data chunks collected during or immediately prior to the event, thus improving efficiency when analyzing possible correlations. Collecting parallel batch data also provides redundancy.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
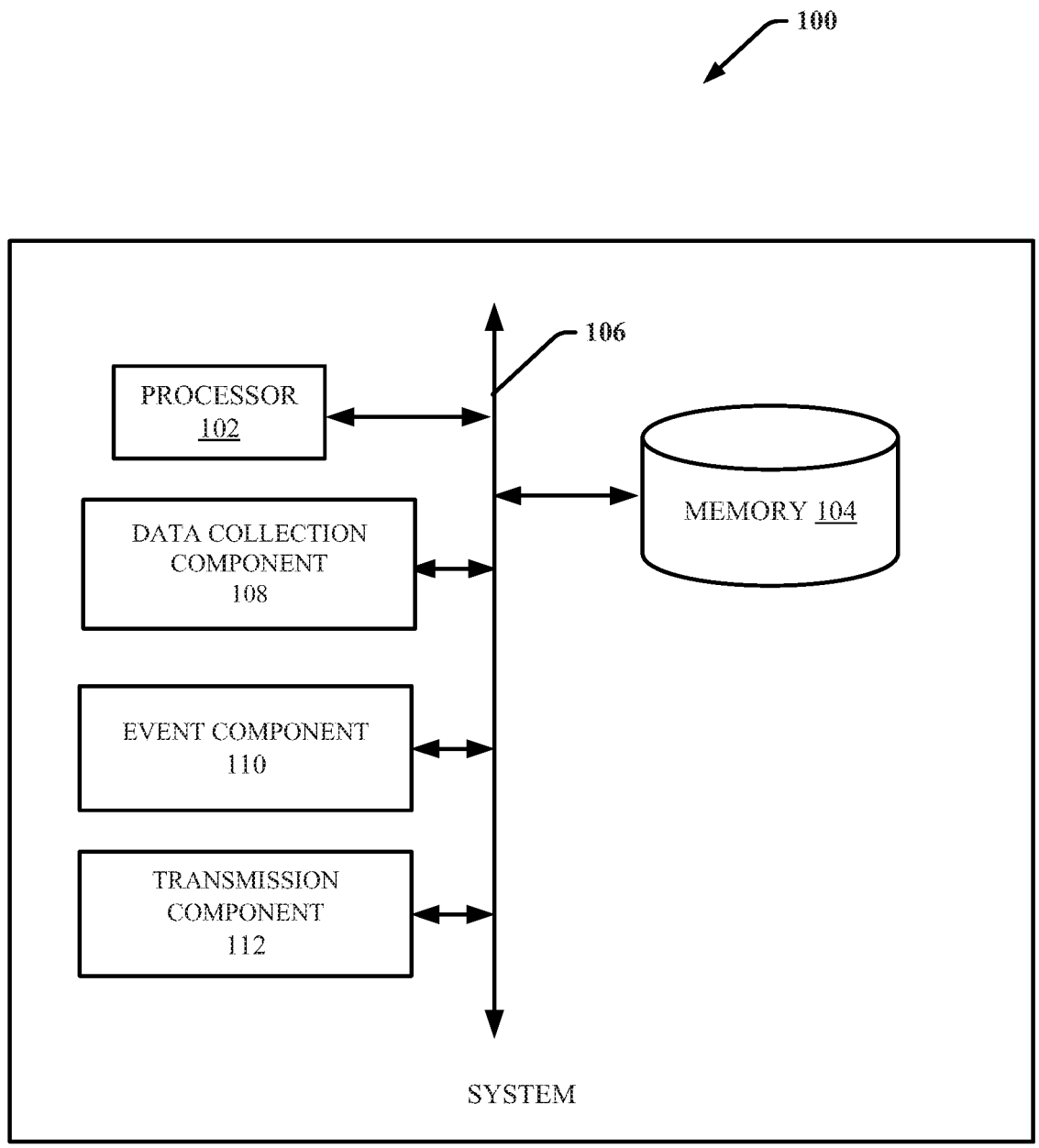
FIG. 1 illustrates a block diagram of an example, non-limiting system that facilitates closed loop parallel batch data logging in a vehicle in accordance with one or more embodiments described herein.

Turning now to the drawings, FIG. 1 illustrates a block diagram of an example, non-limiting system 100 that facilitates closed loop parallel batch data logging in a vehicle in accordance with one or more embodiments described herein. The system 100 includes a processor 102 that executes computer executable components stored in at least one memory 104. The system 100 can further include a system bus 106 that can couple various components, including, but not limited to, a data collection component 108, an event component 110 and a transmission component 112. The data collection component 108 receives data from a plurality of devices related to a vehicle and stores batches of the data as data chunks. The event component 110 determines an event associated with the vehicle. The transmission component 112 transmits a chunk of the data chunks temporally associated with the event.

In certain embodiments, the data collection component 108 can receive data from a plurality of devices related to a vehicle and store batches of the data as data chunks. For example, instead of storing data in a long, continuous log, data can be stored as data chunks. In one example, data chunks stored by the data collection component 108 can be determined by the aggregate amount of data in the data chunk. Once the amount of aggregate date reaches a determined limit, the data chunk is stored by the data collection component 108 and new data received is stored in the next data chunk. In another example, data chunks can be determined by time intervals. Once a time period ends, the data chunk collected in that time period is stored by the data collection component 108 and new data received is stored in the data chunk associated with the subsequent time period. A vehicle can represent any type of suitable vehicle, including an automobile, a truck, a motorcycle, construction equipment, an airplane, a helicopter, a military vehicle, or any other type of vehicle capable of implementing various aspects of the closed loop parallel batch data logging techniques described in this disclosure.

In another example, the data collected by the data collection component 108 can include any data associated with the operation or maintenance of a vehicle. For example, data collected by the data collection component 108 can include data generated by devices such as sensors. Types of sensors can include position sensors, speed and velocity sensors, acceleration sensors, pressure sensors, temperature sensors, force and torque sensors, flowmeters, gas sensors and the like. In another example, data collected by the data collection component 108 can include driver operation data such as speed, acceleration, lane departure, braking and the like. Driver operation data can also include data associated with use of driver controls such as lights, turn signal, cruise control and the like. In another example, data collected by the data collection component 108 can include data generated by vehicle systems such as electrical system, steering system, fuel system, climate control system, traction control system, exhaust system and the like.

In certain embodiments, the data collection component 108 can collect and store adjacent chunks of the data chunks to overlap temporally to provide redundancy. For example, as data is collected in data chunks, data chunks can be stored by the data collection component 108 as overlapping data, thus reducing risk of error in the collection or storage of data. In this example, the data collection component 108 can be configured to establish the extent to which data can be collected and stored as overlapping data in one or more data chunks. For example, the data collection component 108 can be configured to begin collecting a second, adjacent data chunk of data once a data chunk has reach substantially one-half of the prescribed size of the data chunk. Thus, the second portion of data in one data chunk can overlap with the first portion of data in the next, adjacent data chunk.

In certain embodiments, the data collection component 108 can store redundant data chunks respectively in different memory 104. For example, as adjacent chunks of the data chunks are collected, the data collection component 108 can utilize two or more memory 106 sources to store redundant data chunks. Thus, data can be preserved in the event of a failure of one memory 106 source.

In certain embodiments, the event component 110 can determine an event associated with a vehicle. For example, an event determined by the event component 110 can be any suitable event that affects operation or maintenance of the vehicle. In one example, an event can include a failure or malfunction of a vehicle component or system such as an engine, transmission, electrical system, brake system or the like. In another example, an event can include a failure of a device in the vehicle such as a windshield wiper or airbag. In another example, an event can include occurrence of an accident or near accident involving the vehicle. For example, if a driver of a vehicle suddenly uses brakes and the vehicle slides off the road, this can constitute an event determined by the event component even if no collision occurs.

In certain embodiments, the determination of an event by the event component 110 can identify which data chunks are stored by the data collection component 108 and which data chunks are discarded by the data collection component 108 after being temporarily stored. For example, the data collection component 108 can store data chunks temporally associated with the event determined by the event component 110. Data chunks not temporally associated with the event determined by the event component 110 can be stored temporarily by the data collection component 108 and then discarded. In this non-limiting example, only the data chunk collected at the time the event occurs, or the one or more data chunks that occurred immediately prior to time of the event, will be stored.

In certain embodiments, the transmission component 112 can transmit a chunk of the data chunks temporally associated with an event. In one example, a chunk of the data chunks temporally associated with an event can be transmitted wirelessly for further analysis. For example, a chunk of the data chunks can be transmitted to the vehicle manufacturer or a vehicle maintenance service. In one example, if an event occurs that is associated with possible malfunction of a vehicle's traction control system, a subset of the data chunks associated with the event and the possible malfunction can be transmitted to the vehicle manufacturer for further analysis. In another example, the subset (or chunk) of data chunks associated with the event and the possible malfunction can be transmitted to a local vehicle dealership for maintenance recommendations.

In another example, a chunk of the data chunks temporally associated with an event can be transmitted to another system within the vehicle. For example, a chunk of the data chunks temporally associated with an event can be transmitted to another system within the vehicle consisting of diagnostic tools. In another example, a chunk of the data chunks temporally associated with an event can be transmitted to another system affecting operation of the vehicle. For example, if an event associated with braking issues is identified by the event component 110, the transmission component 112 can transmit a chunk of the data chunks temporally associated with the event to an automatic forward-collision braking system in the vehicle.

Figure 2:
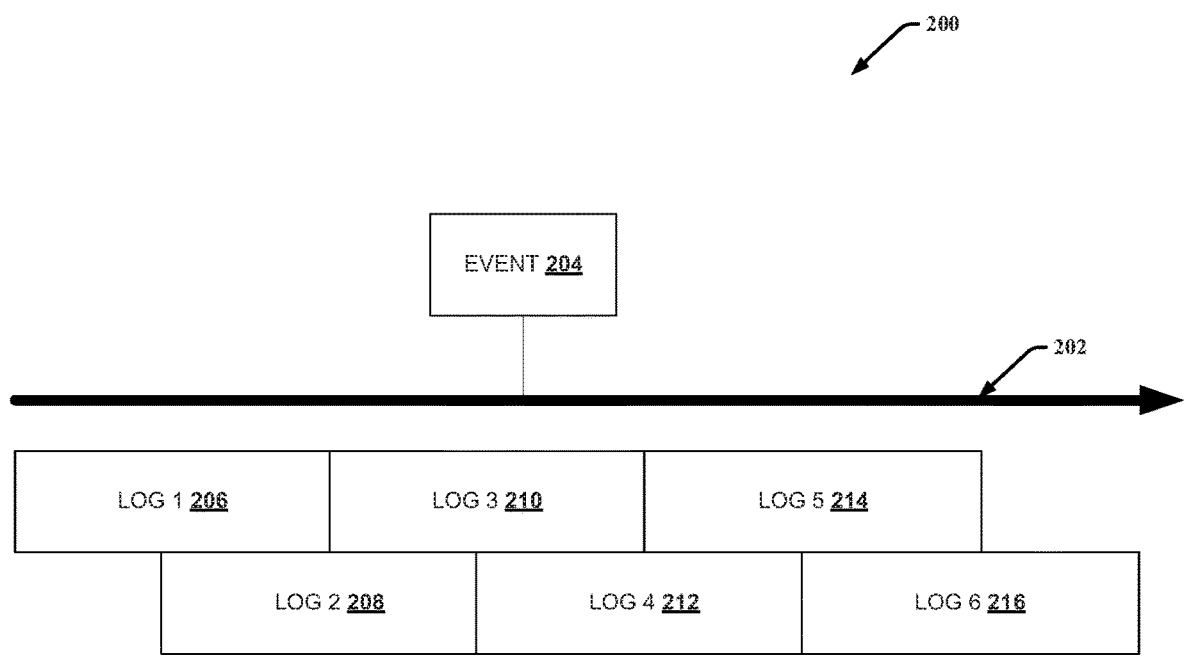
FIG. 2 illustrates an example of a non-limiting system that facilitates closed loop parallel batch data logging in a vehicle in accordance with one or more embodiments described herein.

FIG. 2 illustrates an example of a non-limiting system that facilitates closed loop parallel batch data logging in a vehicle in accordance with one or more embodiments described herein. Repetitive description of like elements employed in other embodiments described herein is omitted for sake of brevity. FIG. 2 depicts an example 200 of data chunks that can be stored by the data collection component 108 and an event 204 determined by the event component 110. In this example, the arrow 202 represents time. Data chunks are represented as logs below the time arrow 202, with Log 1 206 representing a first batch of data received by the data collection component 108 in the time period 202. Log 2 208 represents a second batch of data received by the data collection component 108 which partially overlaps Log 1 206 to create redundancy. Log 3 210 represents the next batch of data received by the data collection component 108 which partially overlaps Log 2 208 to create redundancy. Subsequent logs Log 4 212, Log 5 214 and Log 6 216 follow the same pattern of partial overlap of data with the previous and subsequent log to create redundancy. Upon the occurrence of the event 204 determined by the event component 110, data temporally associated with the event 204 can be stored by the data collection component 108 and transmitted by the transmission component 112. In this example, the batch of data represented by Log 3 210 is collected at the time of the event 204 and thus will be stored by the data collection component 108. Only a portion of the data represented by Log 4 212 is collected before the occurrence of the event 204, and that portion of data is also collected in Log 3 210. Accordingly, the batch of data represented by Log 4 212 will not be stored by the data collection component 108. The batch of data represented by Log 5 214 and Log 6 216 is collected after the occurrence of the event 204 and thus will not be stored by the data collection component. With respect to the batch of data represented by Log 1 206 and Log 2 208, such data will not be stored by the data collection component 108 if the data collection component 108 is configured to only store one batch of data temporally associated with the event 204. If the data collection component 108 is configured to store one or more additional logs immediately preceding the time of the event 204, then Log 2 208 and Log 1 206, respectively, can be stored by the data collection component 108.

Figure 3:
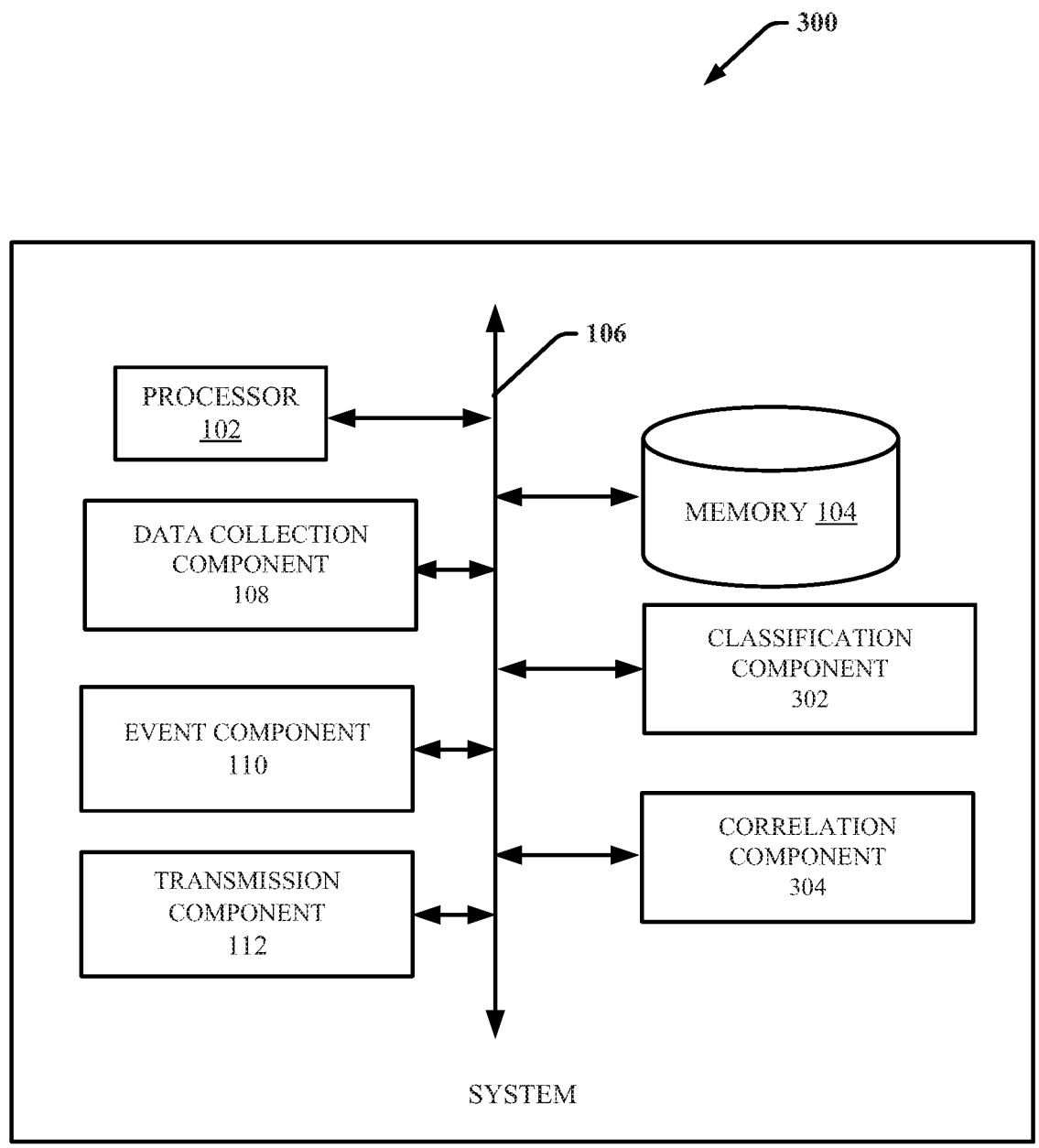
FIG. 3 illustrates a block diagram of another example, non-limiting system that facilitates closed loop parallel batch data logging in a vehicle in accordance with one or more embodiments described herein.

FIG. 3 illustrates a block diagram of another example, non-limiting system that facilitates closed loop parallel batch data logging in a vehicle in accordance with one or more embodiments described herein. Repetitive description of like elements employed in other embodiments described herein is omitted for sake of brevity. In certain embodiments, the system 300 includes a correlation component 304 that identifies correlations between an event and subsets of data classified by a classification component 302. For example, data can be classified by attributes that can affect the operation or maintenance of a vehicle such as tire pressure, engine temperature and the like. In another example, data can be classified by the component, system, device or part in the vehicle associated with the data. For example, data can be associated with a vehicle component such as engine, drivetrain, transmission and the like. In another example, data can be associated with a vehicle system such as brake system, engine cooling system, exhaust system, fuel system and the like.

In another example, the classification component 302 can classify data based upon the source of the data. In this example, the specific system, device or sensor generating the data can be an attribute used by the classification component 302.

In another example, the classification component 302 can classify data associated with the operation or use of the vehicle. This can include data such as speed, acceleration, lane departure, braking and the like. This can also include data associated with use of controls such as climate control, navigation system, audio systems, communication systems and the like.

In another example, the classification component 302 can classify data according to vehicle operation or maintenance categories used by vehicle manufacturers or third-party vehicle maintenance service providers. For example, data can be classified to enable analysis by commonly used diagnostic tools.

In certain embodiments, the correlation component 304 that identifies correlations between an event determined by the event component 110 and subsets of data classified by a classification component 302. For example, if an event determined by the event component 110 includes a minor accident involving a failure to stop in time, the correlation component 304 can identify subsets of data associated with systems such as braking system, anti-lock brakes, traction control and the like. The correlation component 304 can also identify subsets of data associated with operation of the vehicle such as speed, acceleration, braking and the like. The correlation component 304 can also identify subsets of data associated with use of controls such as climate control, navigation system, audio systems, communication systems and the like.

In certain embodiments, the correlation component 304 can employ crowdsourcing to facilitate identifying correlations. For example, the correlation component 304 can utilize data assembled by third-party sources such as a vehicle manufacturer associated with maintenance required for types of vehicles. For example, drivers of a type of vehicle may be experiencing a type of engine problem that the manufacturer has determined is often caused by the failure of a particular sensor. In this example, the correlation component 304 will take such information into account in identifying correlations to an event identified by the event component 110 associated with such engine problem. In another example, a vehicle manufacturer may determine based on vehicle maintenance reports that certain driver behavior such as speed or braking patterns is often associated with a particular maintenance issue for a type of vehicle.

In certain embodiments, correlations identified by the correlation component 304 can be transmitted by the transmission component 112. For example, if the transmission component 112 is transmitting information relating to an event determined by the event component 110 and a chunk of the data chunks temporally associated with the event, the transmitted information can include correlations identified by the correlation component 304. For example, if the transmission component 112 transmits a chunk of the data chunks temporally associated with an event to the vehicle manufacturer or a vehicle maintenance service for further analysis, the inclusion of correlations identified by the correlation component 304 in the transmission can be used in connection with such further analysis.

Figure 4:
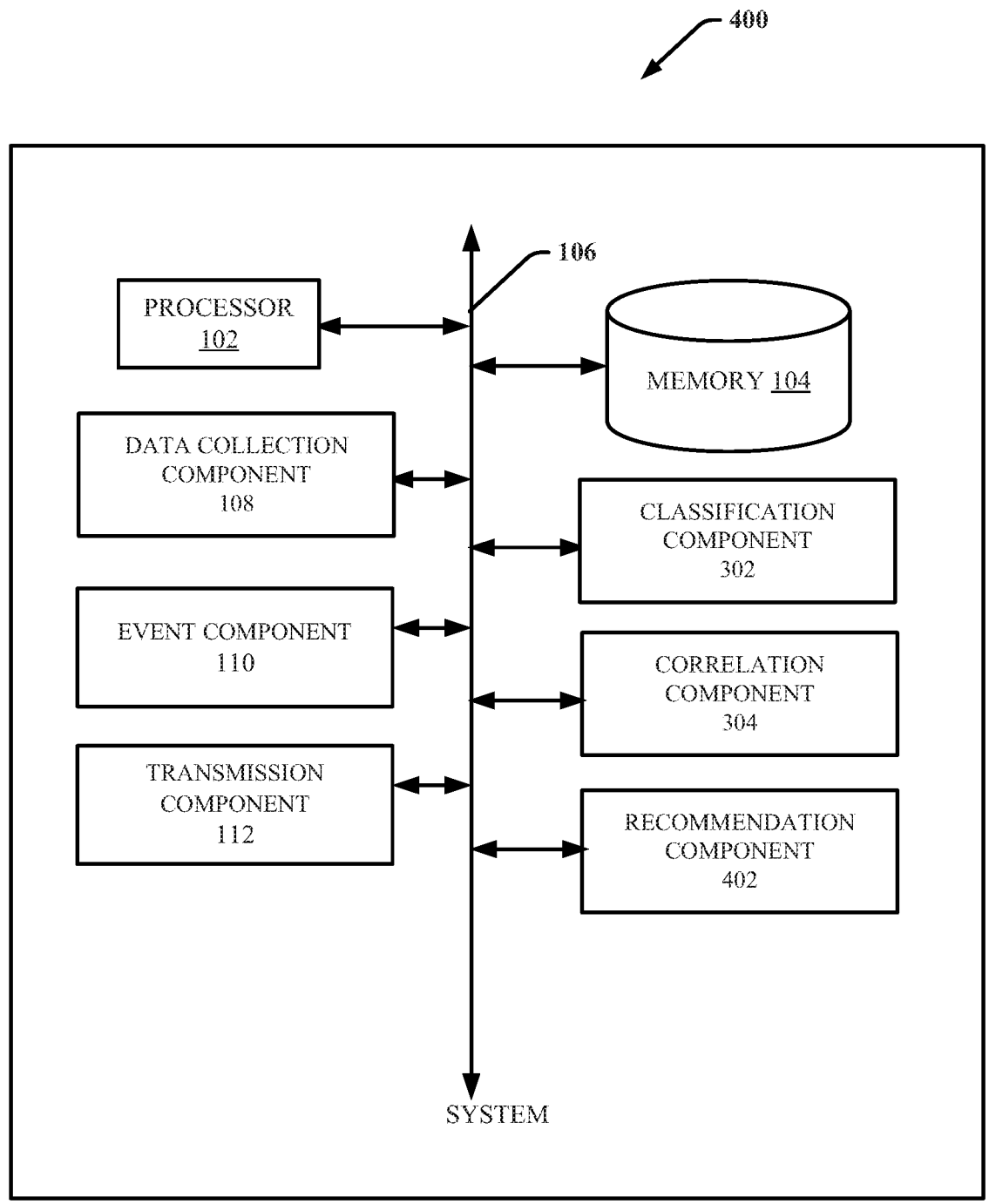
FIG. 4 illustrates a block diagram of yet another example, non-limiting system that facilitates closed loop parallel batch data logging in a vehicle in accordance with one or more embodiments described herein.

FIG. 4 illustrates a block diagram of yet another example, non-limiting system that facilitates closed loop parallel batch data logging in a vehicle in accordance with one or more embodiments described herein. Repetitive description of like elements employed in other embodiments described herein is omitted for sake of brevity. In certain embodiments, the system 400 includes a recommendation component 402 that generates recommendations, based on the event related data chunk and correlations, associated with operation or maintenance of a vehicle. For example, recommendations generated by the recommendation component 402 can include recommendations associated with operation or maintenance of the vehicle. In one example, if an event determined by the event component 110 involves the back of a vehicle sliding during a turn, the recommendation component 402 can recommend that the tire pressure for a back tire be increased if the tire pressure is low. The recommendation component 402 can also recommend that a driver not exceed a certain speed when turning if data associated with excess speed was included in the data chunk temporally associated with the event.

In another example, a recommendation generated by the recommendation component 402 can include additional information associated with the recommendation. For example, the recommendation can include information regarding the nature of an event that occurred and the basis for the recommendation. The recommendation can also include information associated with the urgency of the recommendation and possible consequences for failure to take recommended action. In another example, additional information associated with a recommendation can be delivered in the form of additional communication such as an email or text that provides more detailed information.

In another example, the recommendation component 402 can take into account vehicle maintenance history or scheduled maintenance for the vehicle when generating a recommendation. For example, if an event determined by the event component 110 includes an engine problem that may be related to an engine belt, the recommendation component 402 can consider the estimated condition of the engine belt based upon the next scheduled engine belt replacement.

Figure 5:
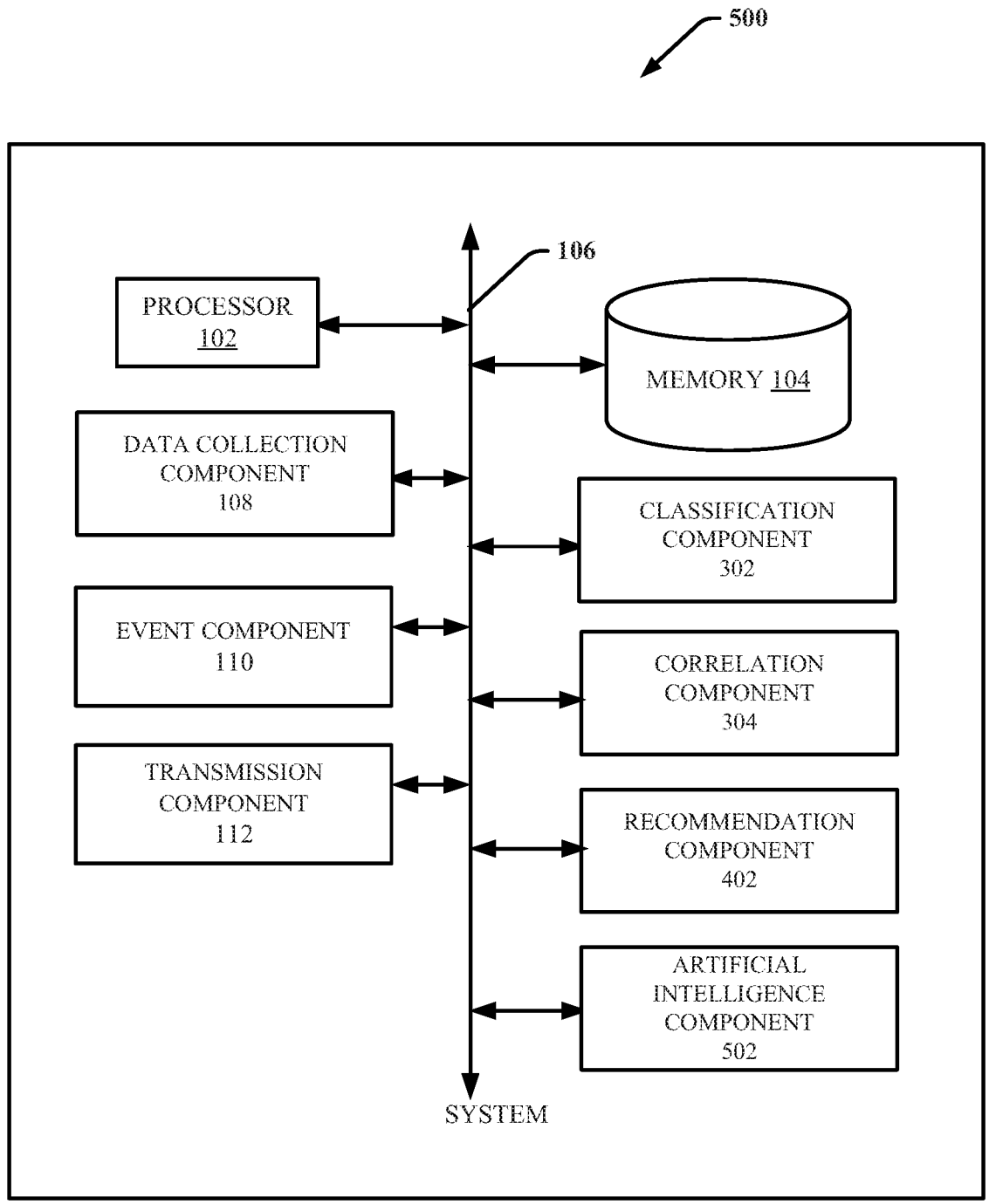
FIG. 5 illustrates a block diagram of yet another example, non-limiting system that facilitates closed loop parallel batch data logging in a vehicle in accordance with one or more embodiments described herein.

FIG. 5 illustrates a block diagram of yet another example, non-limiting system that facilitates closed loop parallel batch data logging in a vehicle in accordance with one or more embodiments described herein. Repetitive description of like elements employed in other embodiments described herein is omitted for sake of brevity. In certain embodiments, the system 500 includes an artificial intelligence component 502 that facilitates the generation of recommendations and performs a utility-based analysis that factors benefit associated with making a recommendation versus cost. For example, the artificial intelligence component 502 enables the recommendation component 402 to utilize artificial intelligence and machine learning to learn the possible causes of events associated with a vehicle and improve the recommendations generated by the recommendation component 402. In one example, the artificial intelligence component 502 can detect a pattern that a vehicle's traction control system is less effective when the weight of the vehicle associated with passengers and cargo exceeds a certain weight. In this example, the artificial intelligence component 502 can train the correlation component 304 to identity vehicle weight with regard to certain types of events determined by the event component 100, thus improving the recommendations generated by the recommendation component 402 associated with the events.

In another example, the artificial intelligence component 502 can facilitate the generation of recommendations by performing a utility-based analysis that factors benefit associated with making a recommendation versus cost. For example, the artificial intelligence component 502 can consider the likely higher cost associated with immediate resolution of a maintenance issue. In one example, maintenance recommendations associated with safety can be assigned a higher priority with less emphasis on costs as compared to maintenance recommendations associated with passenger comport. Thus, a particular issue with a vehicle's braking system can result in a recommendation to have the issue serviced immediately or a recommendation to have a vehicle towed to a service station to have the issue resolved before the vehicle is driven again. Also, an issue with a vehicle's air conditioning system can result in a recommendation to have the issue serviced when convenient.

In this regard, the artificial intelligence component 502 can perform classifications, correlations, inferences and/or expressions associated with principles of artificial intelligence. For instance, the artificial intelligence component 502 can employ an automatic classification system and/or an automatic classification. In one example, the artificial intelligence component 502 can employ a probabilistic and/or statistical-based analysis (e.g., factoring into the analysis utilities and costs) to learn and/or generate inferences. The artificial intelligence component 502 can employ any suitable machine-learning based techniques, statistical-based techniques and/or probabilistic-based techniques. For example, the artificial intelligence component 502 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the artificial intelligence component 502 can perform a set of machine learning computations. For example, the artificial intelligence component 502 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 6:
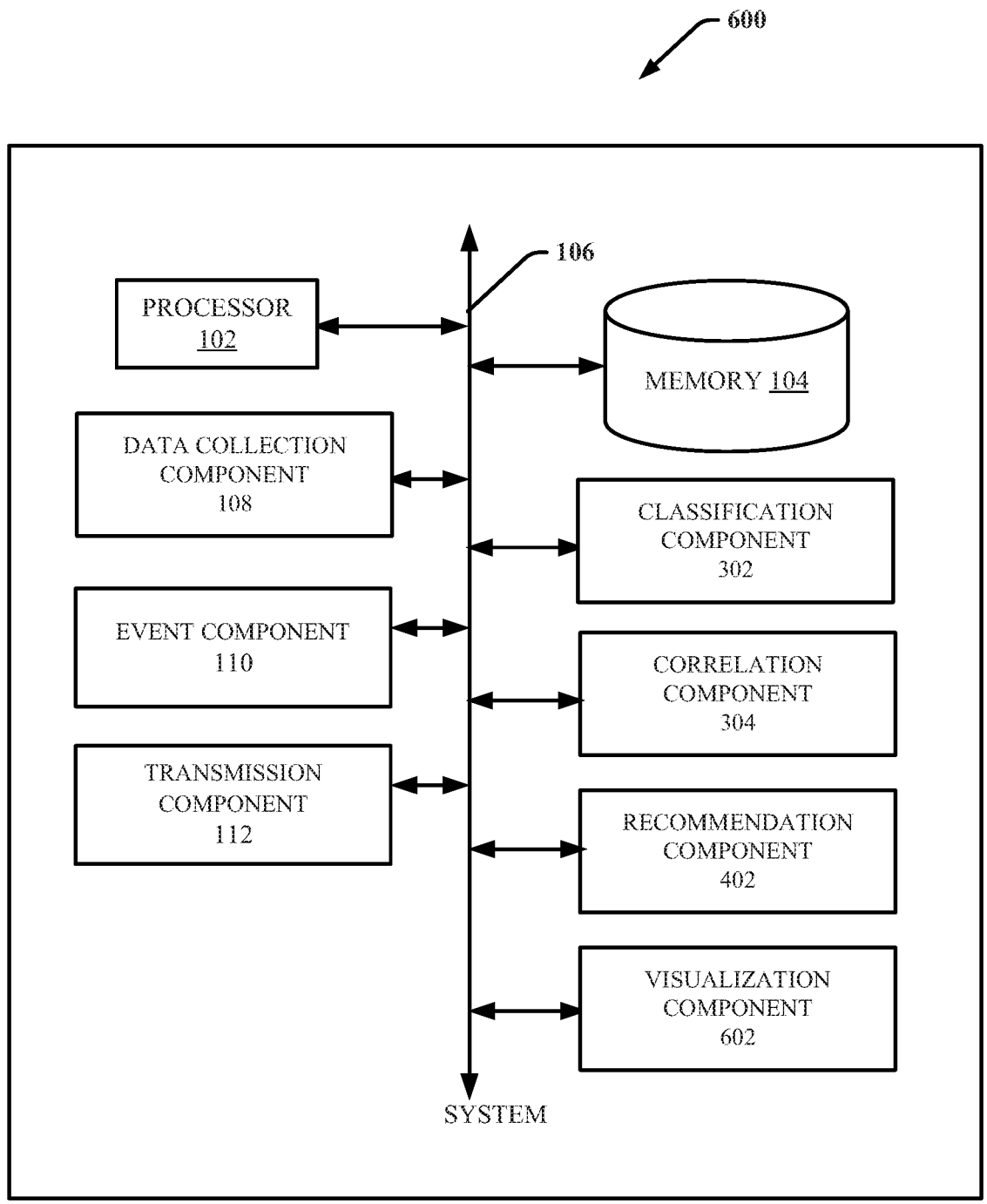
FIG. 6 illustrates a block diagram of yet another example, non-limiting system that facilitates closed loop parallel batch data logging in a vehicle in accordance with one or more embodiments described herein.

FIG. 6 illustrates a block diagram of yet another example, non-limiting system that facilitates closed loop parallel batch data logging in a vehicle in accordance with one or more embodiments described herein. Repetitive description of like elements employed in other embodiments described herein is omitted for sake of brevity. In certain embodiments, the system 600 includes a visualization component 602 that facilitates visualizing output from the recommendation component 402 in an augmented realty environment. For example, the visualization component 602 can overlay text or images onto the field of vision of a diver of a vehicle to convey a recommendation. In one example, the visualization component 602 can generate a rendering of the vehicle in the driver's field of vision with a problem area highlighted for the driver. In another example, if the recommendation component 402 recommends immediate vehicle service for a problem, the visualization component 602 can overlay directions to a maintenance facility in the driver's field of vision.

Figure 7:
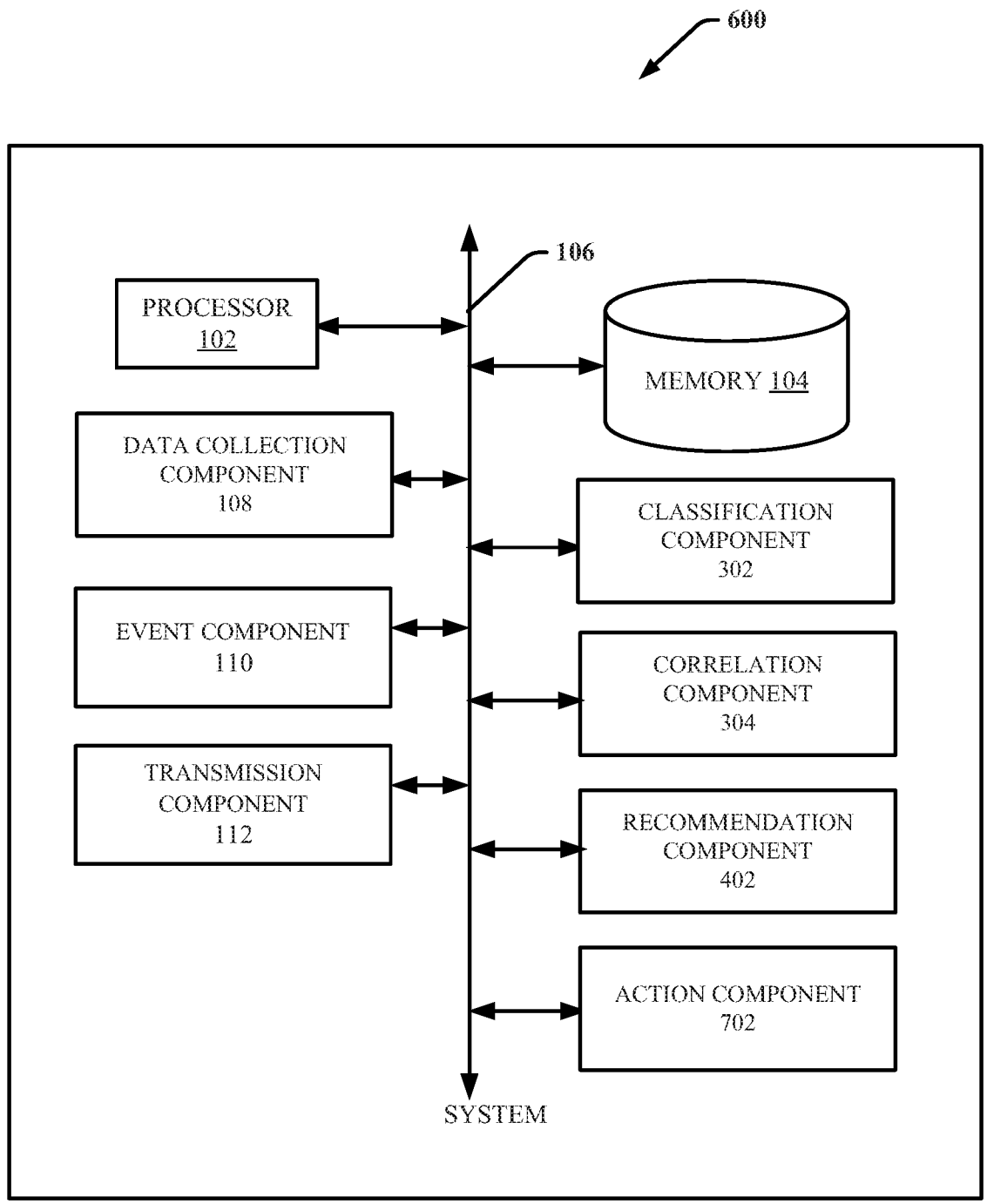
FIG. 7 illustrates a block diagram of yet another example, non-limiting system that facilitates closed loop parallel batch data logging in a vehicle in accordance with one or more embodiments described herein.

FIG. 7 illustrates a block diagram of yet another example, non-limiting system that facilitates closed loop parallel batch data logging in a vehicle in accordance with one or more embodiments described herein. Repetitive description of like elements employed in other embodiments described herein is omitted for sake of brevity. In certain embodiments, the system 700 includes an action component 702 that takes automated action associated with control or operation of the vehicle based on the recommendation output by the recommendation component 402. For example, if the recommendation component 402 recommends immediate service due to a problem with a vehicle's antilock brake system, the action component 402 can disable the vehicle's antilock brake system until the problem is corrected. In another example, if the recommendation component 402 recommends immediate replacement or inflation of a tire due to dangerously low tire pressure, the action component 402 can limit maximum speed and acceleration of the vehicle until the problem is corrected.

Figure 8:
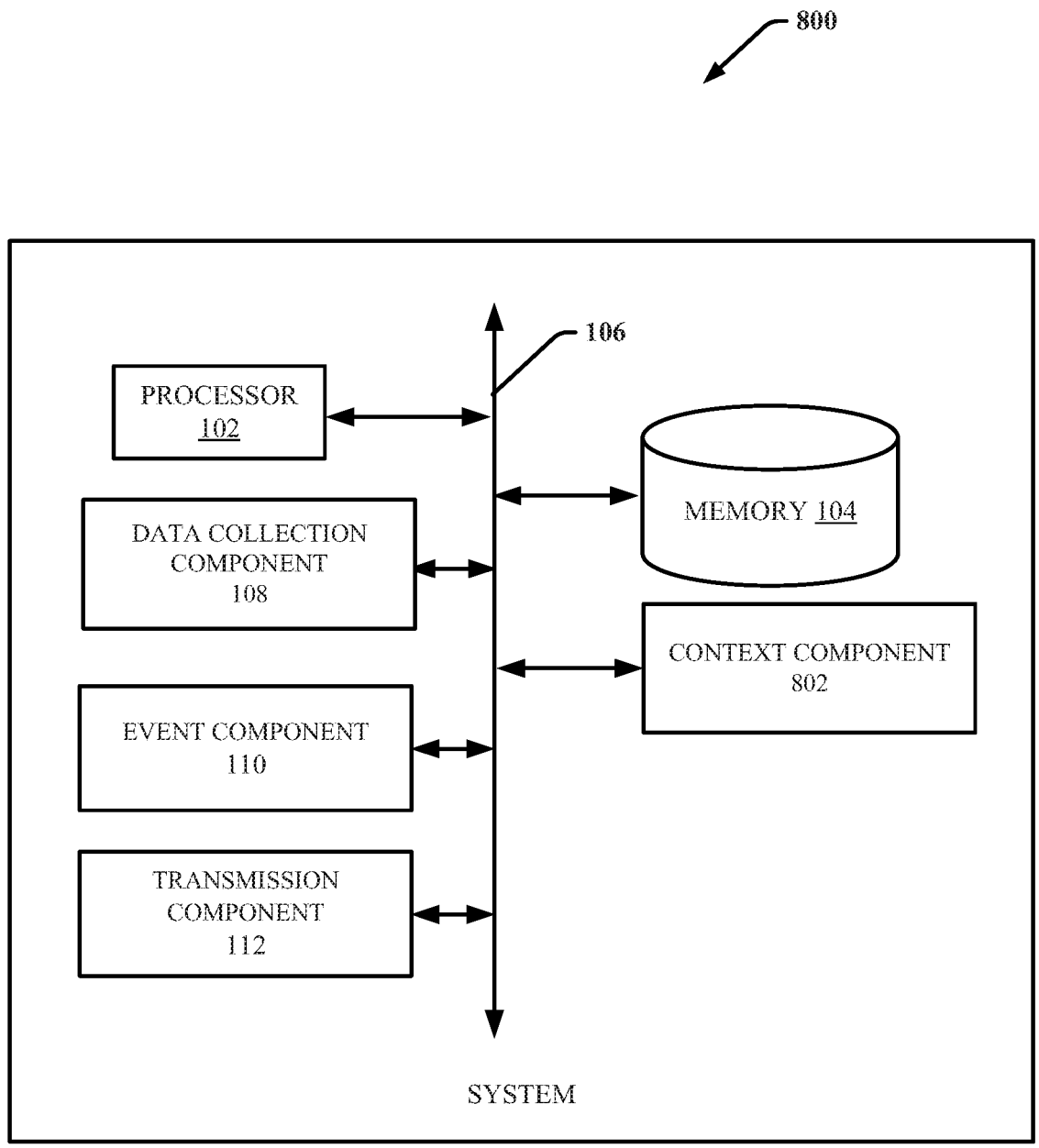
FIG. 8 illustrates a block diagram of yet another example, non-limiting system that facilitates closed loop parallel batch data logging in a vehicle in accordance with one or more embodiments described herein.

FIG. 8 illustrates a block diagram of yet another example, non-limiting system that facilitates closed loop parallel batch data logging in a vehicle in accordance with one or more embodiments described herein. Repetitive description of like elements employed in other embodiments described herein is omitted for sake of brevity. In certain embodiments, the system 800 includes a context component 802 that logs as part of the data chunks vehicle or driver context. For example, the context component 802 can log extrinsic data such as weather, location, road surface, road conditions, traffic conditions and the like. In one example, the vehicle may be in stop-and-go traffic that leads the driver to repeatedly use the brakes of a vehicle. In another example, the vehicle may be traveling on curvy, mountain roads in a rainstorm. In another example, the vehicle may be traveling at a high speed on a gravel road.

In certain embodiments, the context component 802 can log data associated with a driver's identity. In one example, the context component 802 can identify frequent drivers of a vehicle based upon profiles created by the context component 802 of frequent drivers. For example, with respect to a vehicle used by a family, the context component 802 can create profiles of each driver in the family that drives the vehicle. In one example, information used by the context component 802 to create profiles can collected using questionnaires. In another example, the context component 802 can utilize third party sources of information such as driver insurance data. Profiles of drivers can also be updated over time by logging driving history. In another example, the context component 802 can identify a frequent driver using a variety of factors. For example, the context component 802 can identify a frequent driver using selected presets for seat and steering wheel position. In another example, the context component 802 can ask or confirm the identity of a driver using prompts in the vehicle's touch screen controls. In another example, the context component 802 can identify a frequent driver by syncing with the driver's smartphone or other external user device. In another example, using profiles of frequent drivers, the context component 802 can log data such as a driver's driving patterns such as speed and acceleration, braking patterns and patterns associated with distractions such as usage of smart phones while driving.

In certain embodiments, the context component 802 can log data associated with driver demographics. For example, if the context component 802 is unable to determine the identity of a driver, the context component 802 can discern demographic information about the driver. In one example, the context component 802 can identify demographic characteristics of a driver by syncing with the driver's smartphone or other external user device. For example, the context component 802 can determine that one driver is an inexperienced teenager and a second driver is an elderly person.

In certain embodiments, the context component 802 can log data associated with the identity or demographics of one or more passengers. For example, the context component 802 can determine if a teenage driver is accompanied by a parent or by friends of a similar age. In another example, the context component 802 can determine if a driver is accompanied by one or more young children in car seats.

Figure 9:
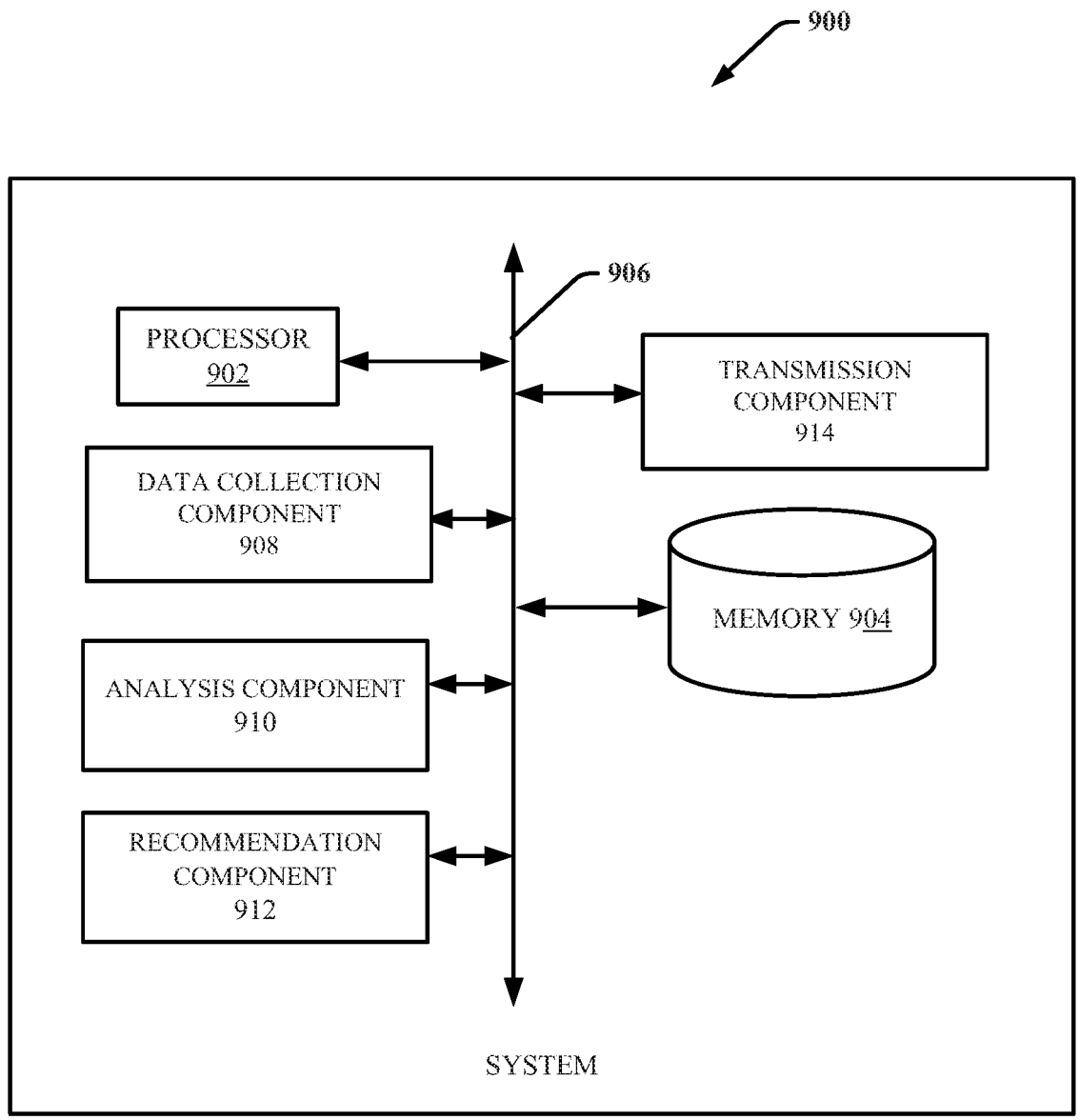
FIG. 9 illustrates a block diagram of yet another example, non-limiting system that facilitates closed loop parallel batch data logging in a vehicle in accordance with one or more embodiments described herein.

FIG. 9 illustrates a block diagram of yet another example, non-limiting system that facilitates closed loop parallel batch data logging in a vehicle in accordance with one or more embodiments described herein. Repetitive description of like elements employed in other embodiments described herein is omitted for sake of brevity. The system 900 includes a processor 902 that executes computer executable components stored in at least one memory 904. The system 900 can further include a system bus 906 that can couple various components, including, but not limited to, a data collection component 908, an analysis component 910, a recommendation component 912 and a transmission component 914. The data collection component 908 wirelessly receives a chunk of data from a vehicle, wherein the data chunk is temporally associated with an event associated with the vehicle. The analysis component 910 analyzes the data chunk, and determines or infers cause of the event. The recommendation component 912 recommends a course of action in response to the event. The transmission component 914 wirelessly transmits the recommendation to the vehicle.

In certain embodiments, the data collection component 908 can wirelessly receive a chunk of data from a vehicle, wherein the data chunk is temporally associated with an event associated with the vehicle. For example, the system 900 can reside in a cloud computing system that can receive and transmit data wirelessly. By limiting the data sent to the data collection component 908 to a data chunk is temporally associated with an event associated with the vehicle, the time required to transmit data from a vehicle to the data collection component is minimized.

In one example, the determination of an event associated with a vehicle and identification of data temporally associated with the event can be made by a device or system located in the vehicle. In another example, the data collection component 908 can wirelessly configure a device or system located in the vehicle for purposes of determining an event associated with the vehicle and identifying data temporally associated with the vehicle.

In another example, the data collection component 908 can assemble a corpus of data consisting of data received from vehicles.

In certain embodiments, the analysis component 910 can analyze the data chunk, and determine or infer cause of the event. For example, the analysis component 910 can identify correlations in the data chunk that can enable a determination or inference of cause of the event. In another example, the analysis component 910 can also analyze data chunks received by the data collection component 908 from the vehicle associated with similar events. In another example, the analysis component 910 can also analyze the corpus of data assembled by the data collection component 908 for data associated with similar events.

In certain embodiments, the initial analysis conducted by the analysis component 910 can be limited to data included in the data chunk in order to minimize the time required for analysis. If the determination or inference of the cause of the event meets a minimum threshold of accuracy probability, no additional analysis would be required. If the determination or inference of the cause of the event does not meet a minimum threshold of accuracy probability, the analysis component 910 can conduct additional analysis taking into account data included in the corpus of data assembled by the data collection component 908 from other vehicles. For example, the analysis component 910 can first analyze data associated with similar events and similar vehicles. If the determination or inference of the cause of the event does not meet a minimum threshold of accuracy probability after analysis of such additional data, the analysis component 910 can conduct additional analysis considering additional data included in the corpus of data assembled by the data collection component 908 from other vehicles.

In another example, the analysis component 910 can consider data received in a specified time period from multiple vehicles. For example, if the data collection component 908 receives data associated with a type of event in a specified time period from multiple vehicles, then the analysis component 910 can consider data chunks related to all such events when analyzing cause of each such event.

In another example, the analysis component 910 can identify trends by analyzing the corpus of data assembled by the data collection component 908 consisting of data received from vehicles. For example, the analysis component 910 can identify an increase in malfunctions of a lane departure system included in certain models of vehicles and determine a likely cause of such malfunction. In this example, the trend and likely cause identified by the analysis component 910 can be taken into account when analyzing data chunks to determine the cause of events with similar malfunctions.

In certain embodiments, the recommendation component 912 can recommend a course of action in response to the event. For example, after determination or inference of cause of an event by the analysis component 910, the recommendation component 912 can recommend a course of action in response to the event. In another example, if the analysis component 910 identifies trends that enables the analysis component 910 to infer the likelihood of similar events in similar vehicles, the recommendation component 912 can recommend a course of action in order to prevent similar events. For example, if the analysis component 910 identifies problems with the adaptive cruise control system of a new vehicle, the recommendation component 912 can recommend all vehicles with the system disable the system pending a maintenance review.

In certain embodiments, the transmission component 914 can wirelessly transmit the recommendation to the vehicle. If the vehicle is unable to receive the transmission, the transmission component 914 can continue to send wireless transmissions to the vehicle at regular intervals until the vehicle is able to receive wireless transmissions.

In another example, the transmission component 914 can also transmit the recommendation to an owner or user of the vehicle. For example, the transmission component 914 can also transmit the recommendation by email or text message. In another example, the transmission component 914 can also transmit the recommendation to the vehicle manufacturer or a vehicle maintenance service.

Figure 10:
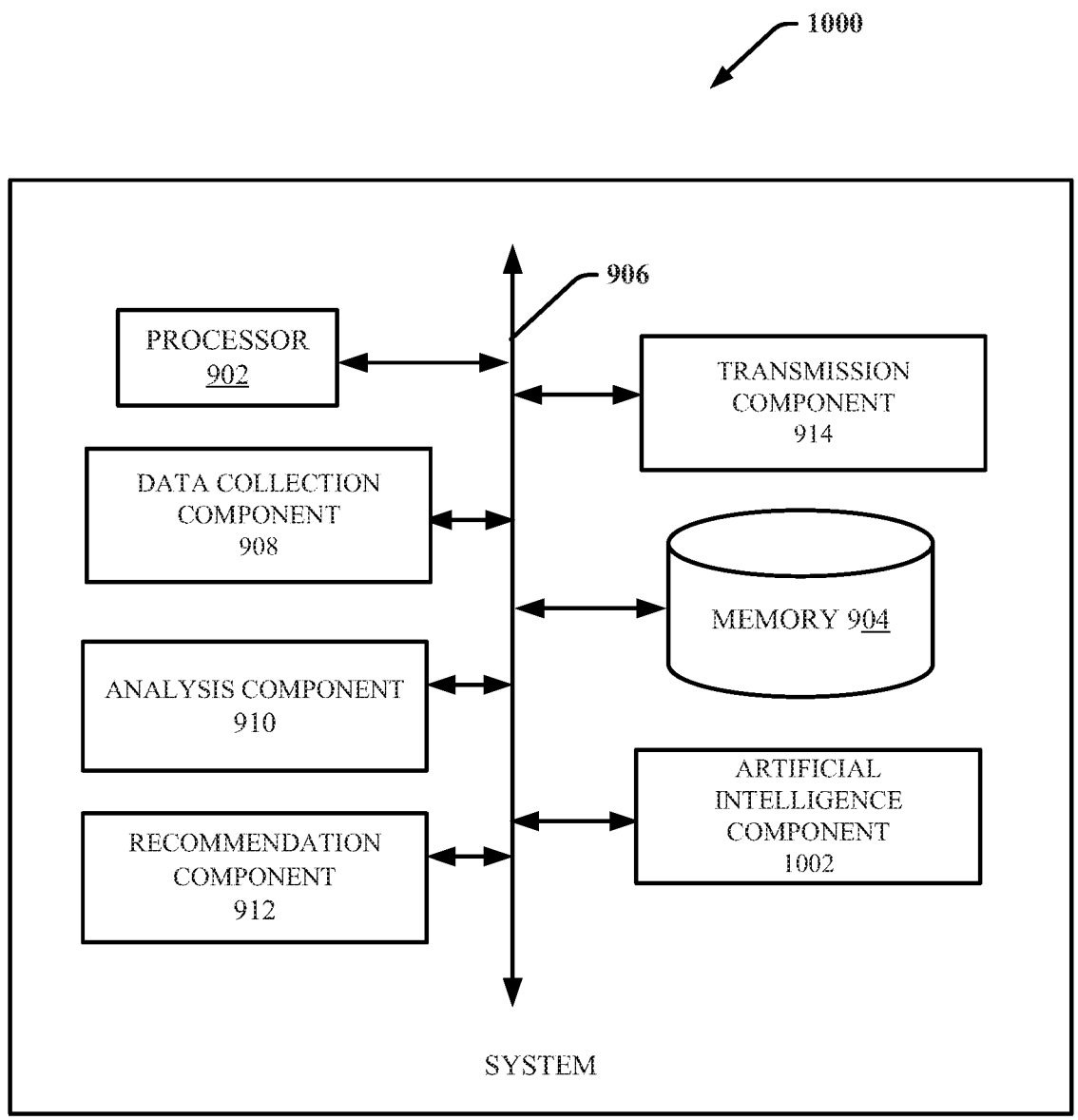
FIG. 10 illustrates a block diagram of yet another example, non-limiting system that facilitates closed loop parallel batch data logging in a vehicle in accordance with one or more embodiments described herein.

FIG. 10 illustrates a block diagram of yet another example, non-limiting system that facilitates closed loop parallel batch data logging in a vehicle in accordance with one or more embodiments described herein. Repetitive description of like elements employed in other embodiments described herein is omitted for sake of brevity. In certain embodiments, the system 1000 includes an artificial intelligence component 1002 that facilitates the generation of recommendations by the recommendation component 912, and performs a utility-based analysis that factors benefit associated with making a recommendation versus cost. For example, the artificial intelligence component 1002 can continually review and analyze the corpus of data assembled by the data collection component 908 consisting of data received from vehicles. As more data is collected, the artificial intelligence component 1002 can identify correlations, patterns and trends that can be used by the recommendation component 912 to improve recommendations. In another example, the artificial intelligence component 1002 can utilize maintenance records to compare recommendations generated by the recommendation component 912 to actual maintenance completed after an event.

In certain embodiments, the artificial intelligence component 1002 can predict the likelihood that certain types of events will occur with respect to certain types of vehicles, systems, components and the like.

Figure 11:
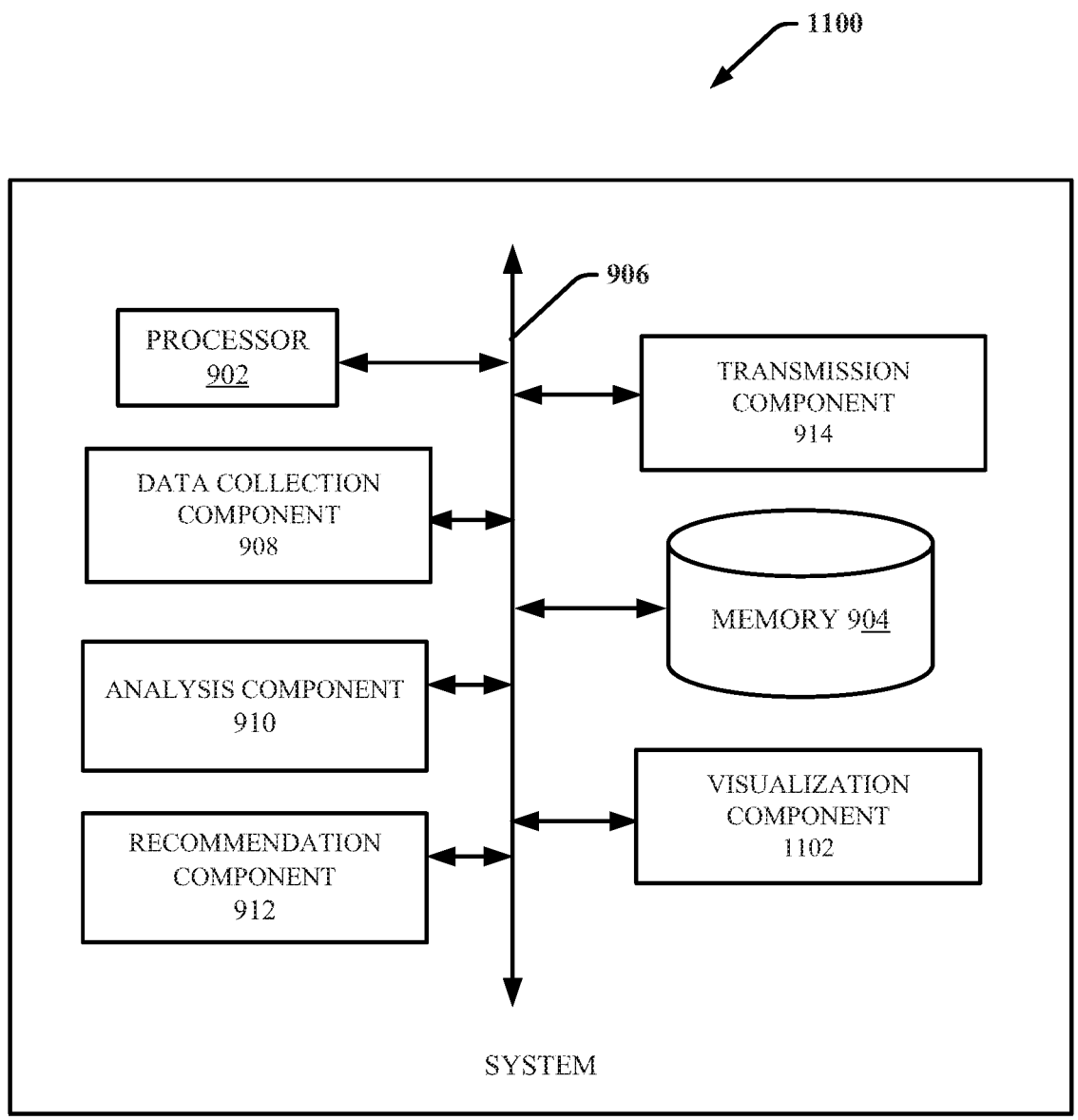
FIG. 11 illustrates a block diagram of yet another example, non-limiting system that facilitates closed loop parallel batch data logging in a vehicle in accordance with one or more embodiments described herein.

FIG. 11 illustrates a block diagram of yet another example, non-limiting system that facilitates closed loop parallel batch data logging in a vehicle in accordance with one or more embodiments described herein. Repetitive description of like elements employed in other embodiments described herein is omitted for sake of brevity. In certain embodiments, the system 1100 includes a visualization component 1102 that facilitates visualizing output from the recommendation component 912 in an augmented realty environment.

Figure 12:
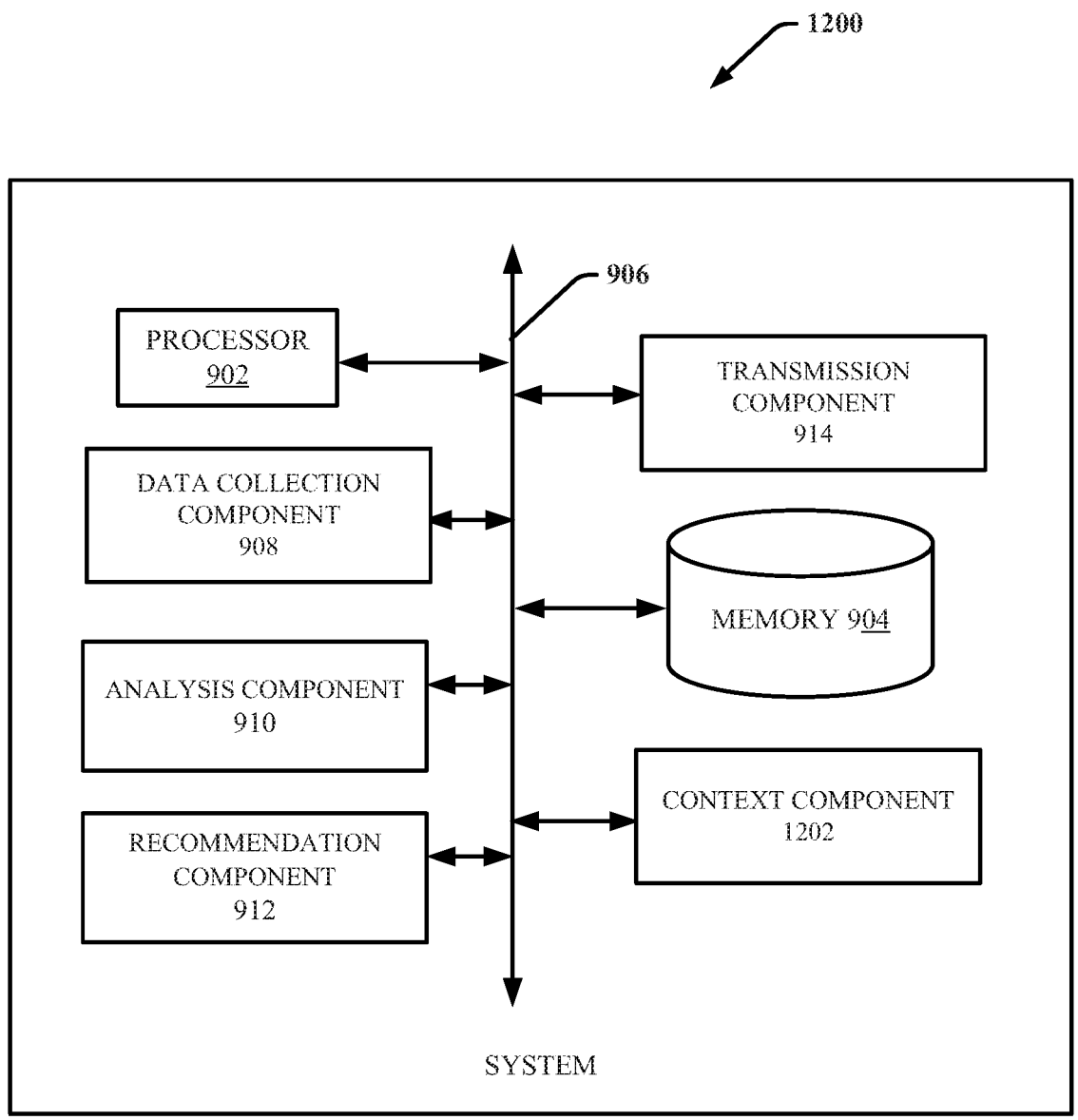
FIG. 12 illustrates a block diagram of yet another example, non-limiting system that facilitates closed loop parallel batch data logging in a vehicle in accordance with one or more embodiments described herein.

FIG. 12 illustrates a block diagram of yet another example, non-limiting system that facilitates closed loop parallel batch data logging in a vehicle in accordance with one or more embodiments described herein. Repetitive description of like elements employed in other embodiments described herein is omitted for sake of brevity. In certain embodiments, the system 1200 includes a context component 1202 that logs as part of the data chunks vehicle or driver context. For example, vehicle or driver context can be a critical factor in determining cause of an event associated with a vehicle. Also, this factor may become more apparent when data is assembled for a large number of similar vehicles. For example, by including road surface information logged by the context component 1202, the analysis component 910 can determine that one type of traction control system performs well on gravel roads while a second type of traction control system consistently performs poorly.

Figure 13:
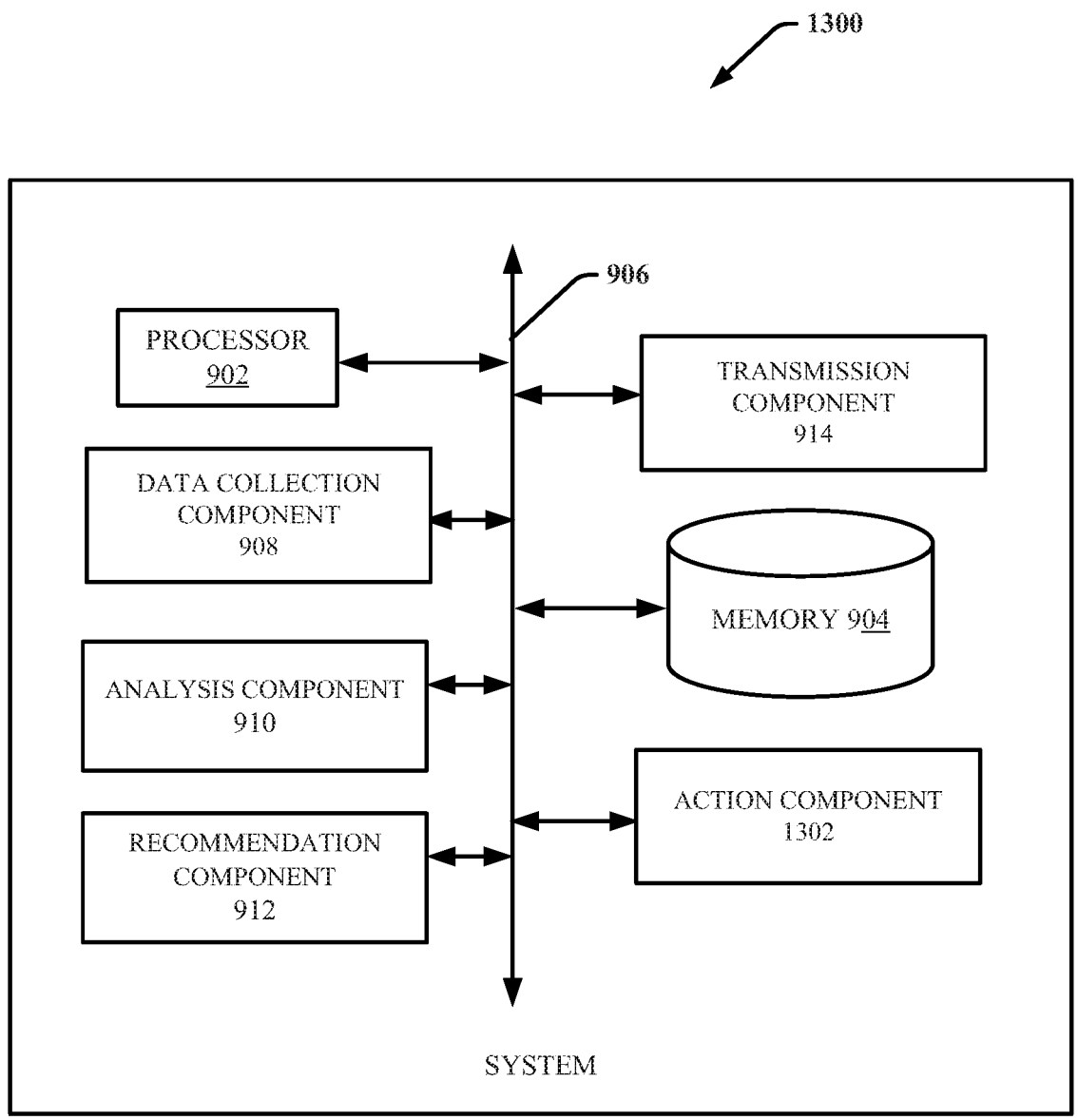
FIG. 13 illustrates a block diagram of yet another example, non-limiting system that facilitates closed loop parallel batch data logging in a vehicle in accordance with one or more embodiments described herein.

FIG. 13 illustrates a block diagram of yet another example, non-limiting system that facilitates closed loop parallel batch data logging in a vehicle in accordance with one or more embodiments described herein. Repetitive description of like elements employed in other embodiments described herein is omitted for sake of brevity. In certain embodiments, the system 1300 includes an action component 1302 that takes automated action associated with control or operation of the vehicle based on the recommendation output by the recommendation component 912. For example, if the analysis component 910 determines that the adaptive cruise control system is a certain model of vehicle is causing serious accidents, the recommendation component 912 can recommend that the adaptive cruise control system be disables in all similar vehicles. In this example, the action component 1302 can automatically disable the system in the vehicles.

Figure 14:
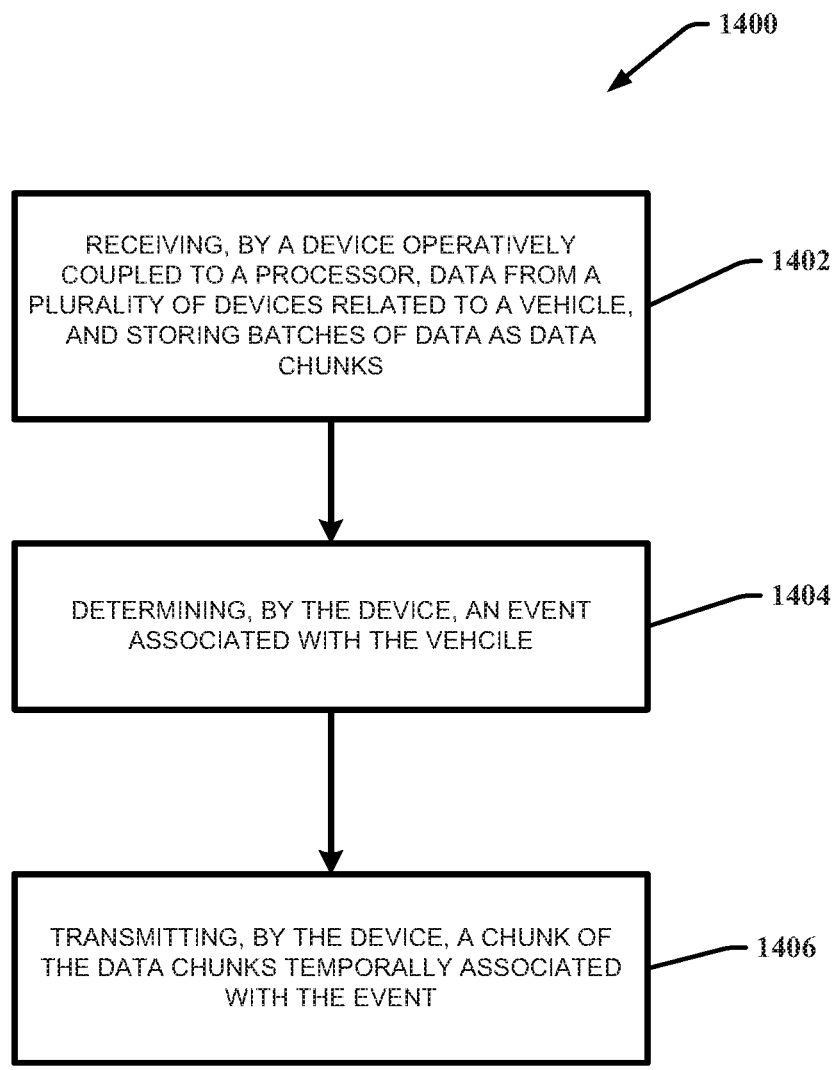
FIG. 14 illustrates a flow diagram of an example of a method to facilitate closed loop parallel batch data logging in a vehicle in accordance with one or more embodiments described herein.

FIG. 14 illustrates a flow diagram of an example of a method to facilitate closed loop parallel batch data logging in a vehicle in accordance with one or more embodiments described herein. Repetitive description of like elements employed in other embodiments described herein is omitted for sake of brevity. 1402 represents a first act that includes receipt of data from a plurality of devices related to a vehicle, and batches of the data are stored as data chunks (e.g., via the data collection component 108). At 1404, an event associated with the vehicle is determined (e.g., via the event component 110). At 1406, a chunk of the data chunks temporally associated with the event is transmitted (e.g., via the transmission component 112).

In certain embodiments, at 1402, adjacent chunks of the data chunks are generated and stored to overlap temporally to provide redundancy (e.g., via the data collection component 108). In certain embodiments, at 1404, correlations between the event and classified subsets of data are identified (e.g., via the correlation component 304). In certain embodiments, at 1404, generates recommendations, based on the event related data chunk and correlations, are generated associated with operation or maintenance of the vehicle (e.g., via the recommendation component 402).

Figure 15:
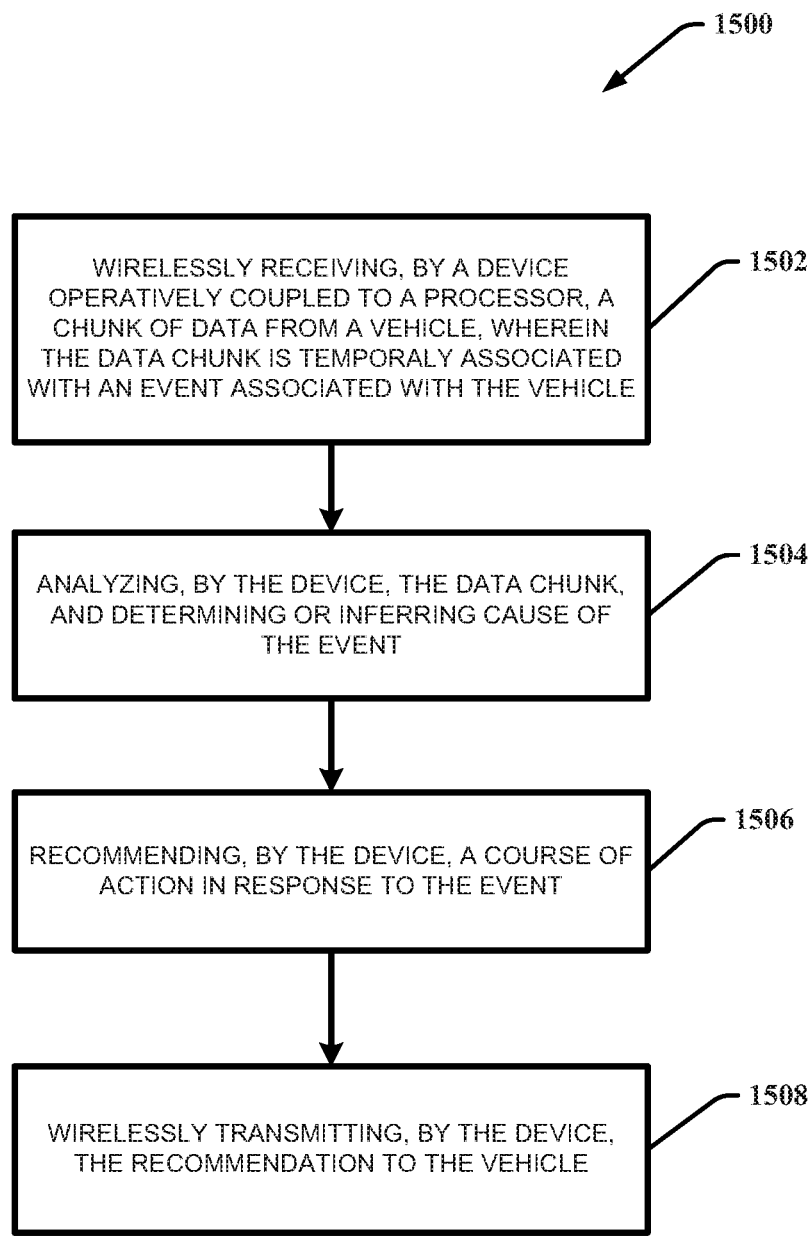
FIG. 15 illustrates a flow diagram of another example of a method to facilitate closed loop parallel batch data logging in a vehicle in accordance with one or more embodiments described herein.

FIG. 15 illustrates a flow diagram of an example of a method to facilitate closed loop parallel batch data logging in a vehicle in accordance with one or more embodiments described herein. Repetitive description of like elements employed in other embodiments described herein is omitted for sake of brevity. 1502 represents a first act that includes a chunk of data from a vehicle is received wirelessly, wherein the data chunk is temporally associated with an event associated with the vehicle (e.g., via the data collection component 908). At 1504, the data chunk is analyzed, and cause of the event is determined or inferred (e.g., via the analysis component 910). At 1506, a course of action in response to the event is recommended (e.g., via the recommendation component 912). At 1508, the recommendation to the vehicle is wirelessly transmitted (e.g., via the transmission component 914).

The one or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments, but one of ordinary skill in the art can recognize that many further combinations and permutations of these embodiments are possible. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. A system, comprising:
a memory that stores computer executable components;
a processor that executes computer executable components stored in the memory;
a data collection component that:
receives data from a plurality of devices related to a vehicle, wherein the data is temporally sequenced,
generates data chunks from the data that are temporally sequenced, wherein temporally adjacent data chunks of the data chunks comprise respective subgroups of the data that only partially overlap, and wherein respective portions of the respective subgroups of the data that partially overlap in the temporally adjacent data chunks encompass all of the data when combined, and
stores the data chunks in the memory, wherein, for each pair of temporally adjacent data chunks, respective data chunks of the pair of temporally adjacent data chunks are stored on different memory devices of the memory to provide memory device failure redundancy;
an event component that determines an event associated with the vehicle;
a correlation component that employs crowdsourcing to identify correlations between the event and subsets of the data classified by a classification component; and
a transmission component that transmits, to a remote server for storage on the remote server, a data chunk of the data chunks temporally associated with the event.

2. The system of claim 1, wherein the data comprises vehicle data.

3. The system of claim 1, wherein the data comprises driver context data.

4. The system of claim 1, further comprising a recommendation component that generates recommendations, based on the data chunk and the correlations, associated with operation or maintenance of the vehicle.

5. The system of claim 4, further comprising an artificial intelligence component that facilitates the generation of the recommendations, and performs a utility-based analysis that factors benefit associated with making a recommendation versus a cost associated with making the recommendation.

6. The system of claim 4, further comprising a visualization component that facilitates visualizing output from the recommendation component in an augmented realty environment.

7. The system of claim 1, further comprising a context component that logs environmental conditions as part of the data chunks.

8. The system of claim 4, further comprising an action component that takes automated action associated with control or operation of the vehicle based on the recommendation.

9. A system, comprising:
a memory that stores computer executable components;
a processor that executes computer executable components stored in the memory;
an artificial intelligence component that trains a machine learning model to analyze events associated with a vehicle and generate recommendations of actions to perform associated with the events;
a data collection component that wirelessly receives a data chunk from the vehicle, wherein the data chunk is temporally associated with an event associated with the vehicle;
an analysis component that analyzes, using the machine learning model, the data chunk, and determines cause of the event wherein determining the cause of the event comprises:
in response to a determination that a probability of accuracy of the cause of the event is less than a threshold, perform an additional analysis employing crowdsourcing with a corpus of data from other vehicles to identify correlations between the event and subsets of the corpus of data to determine the cause of the event;
a recommendation component that recommends, using the machine learning model, a course of action in response to the event; and
a transmission component that wirelessly transmits the recommendation to the vehicle.

10. The system of claim 9, wherein the machine learning model performs a utility-based analysis that factors benefit associated with making a recommendation versus cost.

11. The system of claim 9, further comprising a visualization component that facilitates visualizing output from the recommendation component in an augmented realty environment.

12. The system of claim 9, further comprising a context component that logs, as part of the data chunks, at least one of vehicle context or driver context.

13. The system of claim 9, further comprising an action component that takes automated action associated with control or operation of the vehicle based on the recommendation.

14. A computer-implemented method comprising:
receiving, by a device operatively coupled to a processor, data from a plurality of devices related to a vehicle, wherein the data is temporally sequenced;
generating, by the device, data chunks from the data that are temporally sequenced, wherein temporally adjacent data chunks of the data chunks comprise respective subgroups of the data that only partially overlap, and wherein respective portions of the respective subgroups of the data that partially overlap in the temporally adjacent data chunks encompass all of the data when combined;
storing the data chunks in a memory, wherein, for each pair of temporally adjacent data chunks, respective data chunks of the pair of temporally adjacent data chunks are stored on different memory devices of the memory to provide memory device failure redundancy;
determining, by the device, an event associated with the vehicle;
identifying, by the device using crowd-sourcing, correlations between the event and classified subsets of the data; and
transmitting, by the device, to a remote server for storage on the remote server, a data chunk of the data chunks temporally associated with the event.

15. The method of claim 14, wherein the data comprises vehicle data and driver context data.

16. The method of claim 14, further comprising generating recommendations, based on the data chunk and the correlations, associated with operation or maintenance of the vehicle.

17. The method of claim 16, further comprising using artificial intelligence to facilitate the generation of the recommendations.

18. The method of claim 16, further comprising visualizing the recommendations using augmented realty.

19. The method of claim 14, further comprising logging environmental conditions as part of the data.

20. The method of claim 16, further comprising taking automated action based on the recommendation.

21. A computer program product comprising a computer readable storage medium having program instructions embodied therewith, the program instructions are executable by a processor to cause the processor to:
receive, by the processor, data from a plurality of devices related to a vehicle, wherein the data is temporally sequenced;
generate, by the processor, data chunks from the data that are temporally sequenced, wherein temporally adjacent data chunks of the data chunks comprise respective subgroups of the data that only partially overlap, and wherein respective portions of the respective subgroups of the data that partially overlap in the temporally adjacent data chunks encompass all of the data when combined;
store the data chunks in a memory, wherein, for each pair of temporally adjacent data chunks, respective data chunks of the pair of temporally adjacent data chunks are stored on different memory devices of the memory to provide memory device failure redundancy;
determine, by the processor, an event associated with the vehicle;
identifying, by the processor using crowd-sourcing, correlations between the event and classified subsets of the data; and
transmit, by the processor, to a remote server for storage on the remote server, a data chunk of the data chunks temporally associated with the event.

22. The computer program product of claim 21, the program instructions are executable by the processor to further cause the processor to generate recommendations, based on the data chunk and the correlations, associated with operation or maintenance of the vehicle.

23. The computer program product of claim 22, further comprising using artificial intelligence to facilitate the generation of the recommendations.

24. The computer program product of claim 22, the program instructions are executable by the processor to further cause the processor to generate a visualization of the recommendations using augmented realty.

25. The computer program product of claim 21, the program instructions are executable by the processor to further cause the processor to log environmental conditions as part of the data.

26. The computer program product of claim 22, the program instructions are executable by the processor to further cause the processor to take an automated action based on the recommendation.

* * * * *